US008023894B2

(12) United States Patent
Goto et al.

(10) Patent No.: US 8,023,894 B2
(45) Date of Patent: Sep. 20, 2011

(54) MOBILE COMMUNICATION STATION, BASE STATION APPARATUS, AND DEDICATED-SHORT-RANGE-COMMUNICATIONS SYSTEM

(75) Inventors: Yukio Goto, Tokyo (JP); Masahiko Ikawa, Tokyo (JP); Hiroyuki Kumazawa, Tokyo (JP); Sadatoshi Nakamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/894,870

(22) Filed: Sep. 30, 2010

(65) Prior Publication Data

US 2011/0021149 A1    Jan. 27, 2011

Related U.S. Application Data

(63) Continuation of application No. 10/992,688, filed on Nov. 22, 2004, now Pat. No. 7,853,209.

(30) Foreign Application Priority Data

Mar. 30, 2004    (JP) ................................. 2004-099862

(51) Int. Cl.
*H04B 7/00* (2006.01)

(52) U.S. Cl. ....... 455/41.2; 455/561; 455/466; 455/418; 370/338

(58) Field of Classification Search ............... 455/41.2, 455/466, 414.1, 11.1, 561, 418; 370/338
See application file for complete search history.

(56) References Cited

U.S. PATENT DOCUMENTS

| 6,272,333 | B1 | 8/2001 | Smith |
| 2003/0005382 | A1 | 1/2003 | Chen et al. |
| 2003/0172201 | A1 | 9/2003 | Hatae et al. |
| 2003/0228842 | A1 | 12/2003 | Heinonen et al. |
| 2004/0048604 | A1 | 3/2004 | Idei |
| 2004/0220995 | A1 | 11/2004 | Tsutsumi |
| 2005/0131911 | A1 | 6/2005 | Chi et al. |

FOREIGN PATENT DOCUMENTS

| CN | 1127865 C | 11/2003 |
| JP | 2001-273591 | 10/2001 |
| JP | 2002-259256 | 9/2002 |
| JP | 2002-278860 | 9/2002 |
| JP | 2005-020533 A | 1/2005 |
| WO | WO 9966746 A2 | 12/1999 |
| WO | WO 02/086714 A2 | 10/2002 |

OTHER PUBLICATIONS

"New Model ETC on Board Equipments 'MOBE-100/200 Series'", Mitsubishi Heavy Industries, Ltd. Technical Review, vol. 40, No. 3, Jun. 2003, 1 Page (with English Translation).

Yutaka Chiku, et al., "R&D on DSRC Platform—R&D on Sub-Platform for Low-Resource Obe-", 7th World Congress on Intelligent Transport Systems, Nov. 6-9, 2000, 9 Pages.

*Primary Examiner* — Kamran Afshar
*Assistant Examiner* — Dung Lam
(74) *Attorney, Agent, or Firm* — Oblon, Spivak, McClelland, Maier & Neustadt, L.L.P.

(57) ABSTRACT

A mobile communication station is provided with a type information registration unit (11) for registering type information indicating a type of data, which an application installed in an external device can use, therein. The mobile communication station transmits the type information registered in the type information registration unit (11) to a base station apparatus, receives data, which the application installed in the external device can use, from the base station apparatus, and then transfers the received data to the external device.

2 Claims, 15 Drawing Sheets

FIG.5

| APPLICATION | IDENTIFIER | VALUE | NOTE |
|---|---|---|---|
| DEFAULT | default | 0x00 | DEFAULT APPLICATION HANDLING CONTENTS TYPE |
| Web BROWSER | browser | 0x01 | SUPPORTED CONTENTS TYPES VARY DEPENDING UPON INSTALLATION. |
| MAILER | mailer | 0x02 | E-MAIL |
| VOICE REPRODUCING APPLICATION | sound-player | 0x03 | sound CONTENTS TYPE |
| MOVING IMAGE REPRODUCING APPLICATION | video-player | 0x04 | video CONTENTS TYPE |
| CHARACTER-TO-VOICE CONVERTING APPLICATION | tts | 0x05 | text/plain CONTENTS TYPE IS GENERALLY SPECIFIED. SUPPORT ANOTHER CONTENTS TYPE DEPENDING ON INSTALLATION. |
| PSEUDO PUSH | smart-pull | 0x06 | ONLY dsrc/smart-pull IS EFFECTIVE AS CONTENTS TYPE. |
| STORE | store | 0x07 | STORE PUSH DATA. SPECIFICATION OF ARBITRARY CONTENTS TYPES IS POSSIBLE. |
| TRAFFIC INFORMATION DATA PROCESSING APPLICATION | vics | 0x08 | ONLY dsrc/vics CONTENTS TYPE IS EFFECTIVE. |
| TEXT DISPLAY APPLICATION | text-display | 0x09 | DISPLAY TEST DATA. text/plain CONTENTS TYPE IS GENERALLY SPECIFIED. |
| ARBITRARY APPLICATION | private | 0xFF | SPECIFY APPLICATION TYPE WITH ARBITRARY TEXT. |

FIG.6

| CONTENTS TYPE | VALUE | NOTE | TYPE OF pushBody |
|---|---|---|---|
| */* | 0x00 | SPECIFY CONTENTS TYPE WITH TEXT | |
| text/* | 0x01 | SPECIFY TEXT TYPE WITH TEXT | |
| text/plain | 0x02 | PLAIN TEXT | |
| text/enrich | 0x03 | | |
| text/html | 0x04 | HTML TEXT | |
| text/xml | 0x05 | XML TEXT | |
| text/x-hdml | 0x06 | X-HDML TEXT | |
| text/x-html | 0x07 | X-HTML TEXT | |
| reserved for future use | 0x08-0x0F | RESERVED FOR text type | |
| image/* | 0x10 | ARBITRARY IMAGE TYPE SPECIFY IMAGE TYPE WITH TEXT. | |
| image/jpeg | 0x11 | jpeg FILE | MAP IMAGE FILE TO DATA PORTION OF pushBody WITH THE IMAGE FILE REMAINING IN Binary FORMAT |
| image/gif | 0x12 | gif FILE | |
| image/bmp | 0x13 | bmp FILE | |
| image/tiff | 0x14 | tiff FILE | |
| image/png | 0x15 | png FILE | |
| reserved for future use | 0x16-0x1F | RESERVED FOR image type | |
| audio/* | 0x20 | ARBITRARY VOICE TYPE SPECIFY AUDIO TYPE WITH TEXT. | |
| audio/wav | 0x21 | WAV FILE | MAP AUDIO FILE TO DATA PORTION OF pushBody WITH THE IMAGE FILE REMAINING IN Binary FORMAT |
| audio/mp3 | 0x22 | MP3 FILE | |
| audio/wma | 0x23 | WMA FILE | |

FIG.7

| | | | |
|---|---|---|---|
| audio/aiff | 0x24 | AIFF FILE | |
| audio/midi | 0x25 | MIDI FILE | |
| reserved for future use | 0x26-0x2F | RESERVED FOR audio type | |
| video/* | 0x30 | ARBITRARY IMAGE TYPE SPECIFY MOVING IMAGE TYPE WITH TEXT | MAP MOVING IMAGE FILE TO DATA PORTION OF pushBody WITH THE MOVING IMAGE FILE REMAINING IN Binary FORMAT |
| video/mpeg | 0x31 | MPEG FILE | |
| video/real | 0x32 | Real Player FILE | |
| video/qt | 0x33 | Quick Time FILE | |
| reserved for future use | 0x34-0x3F | RESERVED FOR video type | |
| message/* | 0x40 | | |
| message/external-body | 0x41 | | |
| reserved for future use | 0x42-0x4F | RESERVED FOR message type | |
| application/* | 0x50 | | |
| application/java-vm | 0x51 | Java Virtual Machine | |
| application/postscript | 0x52 | Post Script | |
| reserved for future use | 0x53-0x5F | RESERVED FOR application type | |
| multipart/* | 0x60 | | |
| reserved for future use | 0x61-0x7F | RESERVED FOR multipart type | |
| dsrc/* | 0x80 | ARBITRARY CONTENTS FOR DSRC APPLICATIONS SPECIFY APPLICATION TYPE WITH TEXT | |
| dsrc/smart-pull | 0x81 | PSEUDO PUSH | |
| dsrc/vics | 0x82 | VICS FORMAT | TRAFFIC INFORMATION BINARY |
| dsrc/mime | 0x83 | MIME-ENCODED DATA | MIME-ENCODED TEXT FILE IS MAPPED TO DATA PORTION OF pushBody |
| reserved for future use | 0x84-0xFF | RESERVED | |

FIG.11

```
ClientInformation::=SEQUENCE {
    - - VERSION
    version                 INTEGER(0..255),
    - - RECEIVABLE APPLICATION TYPE
    applicationTypeList     ApplicationTypeList,
    - - RECEIVABLE CONTENTS TYPE
    contentTypeList         ContentTypeList,
    - - BUFFER SIZE
    IppBufSize              INTEGER(0..2^32-1),
    - - MAXIMUM SIZE OF CONTENTS
    maxContentsSize         INTEGER(0..2^32-1),
    - - ADDITIONAL INFORMATION
    supplementInfo          OCTET STRING(SIZE(0..127))
}

ApplicationTypeList:=SEQUENCE OF ApplicationType.
ContentTypeList:=SEQUENCE OF ContentType.
```

FIG.12

```
PushOperation::=SEQUENCE{
    res              BIT STRING(2), - - FOR FUTURE EXTENSION
    requireCache     BOOLEAN,- - CACHE REQUEST
    isSegment        BOOLEAN,- - INDICATE WHETHER DIVISION
                                   TRANSFER IS PERFORMED
pushId               INTEGER(0..255),
    applicationType  ApplicationType,- - APPLICATION TYPE
    contentType      ContentType,- - CONTENTS TYPE
    contentSize      NTEGER(0..2^32-1)
    pushBody         OCTET STRING
}
```

FIG.13

```
ConfirmedPushOperation::=SEQUENCE{
    responseTiming      ResponseTiming, - - RESPONSE TIMING SPECIFICATION
    requireCache        BOOLEAN,- - CACHE REQUEST
    isSegment           BOOLEAN,- - APPLICATION TYPE INDICATING WHETHER
                                    DIVISION TRANSFER IS PERFORMED
    pushId              INTEGER(0..255),
    applicationType     ApplicationType,- - APPLICATION TYPE
    contentType         ContentType,- - CONTENTS TYPE s
    contentSize         INTEGER(0..2^32-1)
    pushBody            OCTET STRING
}

ResponseTiming:=INTEGER{

Received    (0),    - - AT TIME OF COMPLETION OF RECEPTION OF
                                    DATA BY VEHICLE-MOUNTED EQUIPMENT
            Transfered  (1),    - - AT TIME OF COMPLETION OF TRANSFER OF
                                    DATA TO EXTERNAL EQUIPMENT
            Executed    (2),    - - AT TIME OF COMPLETION OF EXECUTION
                                    OF CONTENTS
}(0..3)

ConfirmedPushResponse::=SEQUENCE{
    rcs                 BIT STRING(4), - - FOR FUTURE EXTENSION
    pushId              INTEGER(0..255),
    acknowledgement     OCTET STRING,
}
```

FIG.14

```
NextSegRequest::=SEQUENCE{
    fill                BIT STRING(4), - - FOR FUTURE EXTENSION
    pushId              INTEGER(0..255),
}

NextSegment::=SEQUENCE{
    fill                BIT STRING(3), - - FOR FUTURE EXTENSION
    isLast              BOOLEAN, - - LAST SEGMENT IS TRUE
    pushId              INTEGER(0..255),
    segmentNo           INTEGER(2..65535),- - SEQUENCE NUMBER
    segmentBody         OCTET STRING- - DIVIDED pushBody
}
```

Re-PushOperation::=SEQUENCE{
   res                           BIT STRING(4), - - FOR FUTURE EXTENSION
   pushId                      NTEGER(0..255),
   applicationType       ApplicationType,
}

MOBILE COMMUNICATION STATION, BASE STATION APPARATUS, AND DEDICATED-SHORT-RANGE-COMMUNICATIONS SYSTEM

CROSS-REFERENCE TO RELATED APPLICATIONS

This application is a continuation of and is based upon and claims the benefit of priority under 35 U.S.C. §120 for U.S. Ser. No. 10/992,688, filed Nov. 22, 2004, the entire contents of which are incorporated herein by reference and which claims the benefit of priority under 35 U.S.C. §119 from Japanese Patent Application No. 2004-099862, filed Mar. 30, 2004.

BACKGROUND OF THE INVENTION

1. Field of the Invention

The present invention relates to a mobile communication station that receives data from a base station apparatus and then transfers the data to an external device, a base station apparatus that transmits data, which an application can use, to a mobile communication station, and a dedicated-short-range-communications system in which the mobile communication station can carry out dedicated short range communications with the base station apparatus.

2. Description of Related Art

In a prior art dedicated-short-range-communications system, when a mobile station mounted in a moving object enters a communication area of a base station, the mobile station starts wireless communications with the base station so as to transmit and receive information, such as data required for automatic turnpike toll paying, to and from the base station. An application that carries out wireless communications with the base station and transmits and receives predetermined information to and from the base station is pre-installed in the mobile station (refer to non-patent reference 1, for example).
[Non-patent reference 1] Mitsubishi Heavy Industries Technical Review Vol. 40, No. 3, pp. 184

Since the prior art dedicated-short-range-communications system is so constructed as mentioned above, the prior art dedicated-short-range-communications system enables the user to get predetermined services via wireless communications between the mobile station and the base station as long as necessary applications are pre-installed in the mobile station. A problem with the prior art dedicated-short-range-communications system is however that since it has no structure of enabling the addition of any new application, it cannot provide any new service for the user.

SUMMARY OF THE INVENTION

The present invention is made in order to solve the above-mentioned problem, and it is therefore an object of the present invention to provide a mobile communication station and a dedicated-short-range-communications system that enables the addition of a new service.

It is another object of the present invention to provide a base station apparatus that can transmit data, which an application installed in an external device can use, to a mobile communication station.

In accordance with the present invention, there is provided a mobile communication station including: a registration unit for registering type information indicating a type of data, which an application installed in an external device can use, therein; a wireless communications unit for transmitting the type information registered in the registration unit to a base station apparatus, and for receiving data, which the application installed in the external device can use, from the base station apparatus; and a data transfer unit for transferring the data received by the wireless communications unit to the external device.

Therefore, the present invention offers an advantage of being able to provide a new service by simply making a registration of type information into the registration unit without adding any application to the mobile communication station.

Further objects and advantages of the present invention will be apparent from the following description of the preferred embodiments of the invention as illustrated in the accompanying drawings.

BRIEF DESCRIPTION OF THE DRAWINGS

FIG. 5 is a diagram showing identifiers for identifying applications which can be installed in external devices;

FIG. 6 is a diagram showing the first half of a list of identifiers for identifying the types of data;

FIG. 7 is a diagram showing the second half of the list of identifiers for identifying the types of data;

FIG. 11 is a diagram showing information included in type information which a dedicated-short-range-communications system in accordance with embodiment 3 of the present invention uses;

FIG. 12 is a diagram showing the data structure of data which a base station apparatus transmits to a mobile communication station in the dedicated-short-range-communications system in accordance with embodiment 3 of the present invention in a case where the mobile communication station sends no acknowledgement signal back to the base station apparatus;

FIG. 13 is a diagram showing the data structure of data which the base station apparatus transmits to the mobile communication station in a case where the mobile communication station sends an acknowledgement signal back to the base station apparatus;

FIG. 14 is a diagram showing the data structure of data which the base station apparatus transmits to the mobile communication station in a case where the base station apparatus divides the data into several pieces;

DETAILED DESCRIPTION OF THE PREFERRED EMBODIMENTS

Embodiment 1

Figure 1:
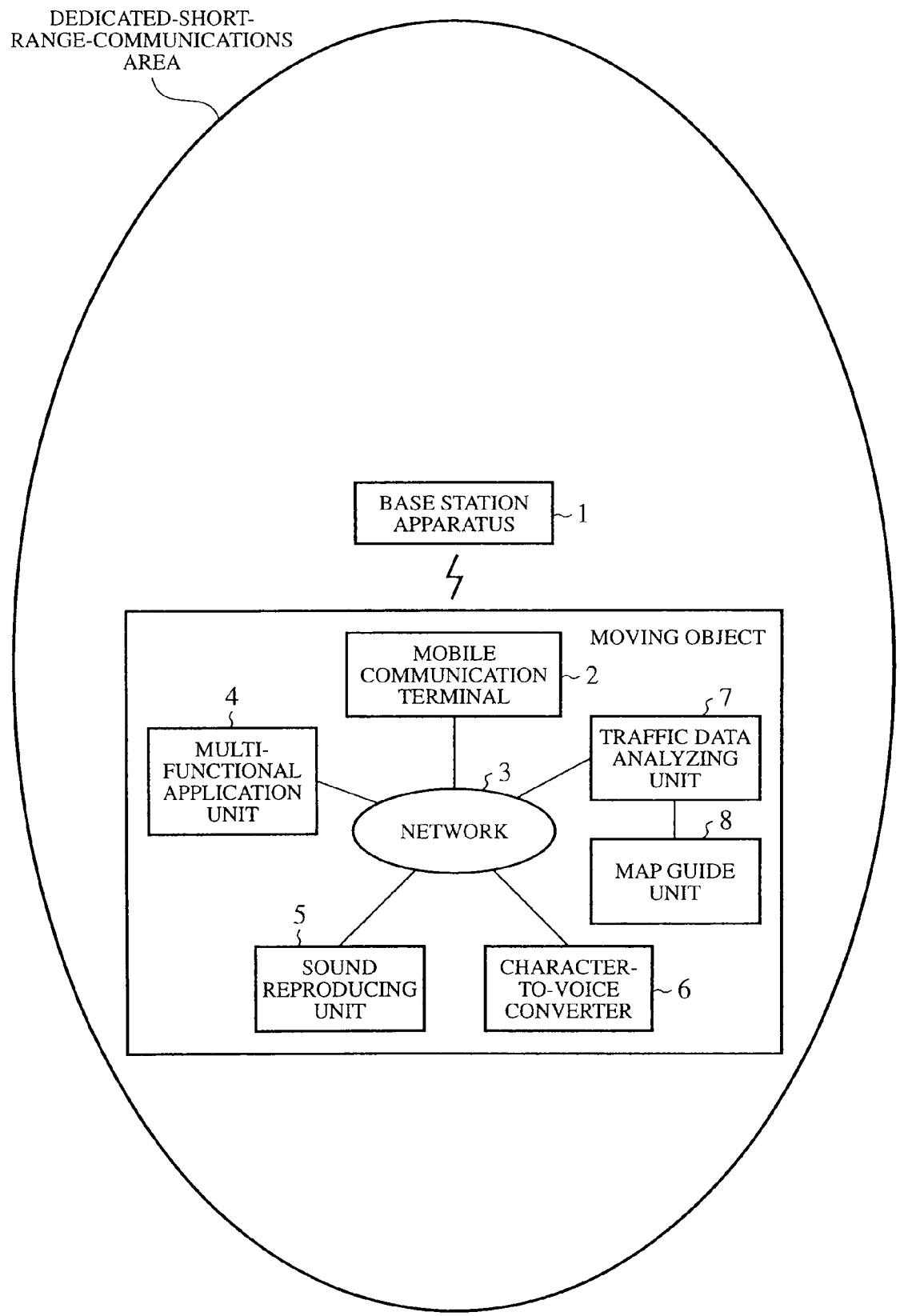
FIG. 1 is a block diagram showing a dedicated-short-range-communications system in accordance with embodiment 1 of the present invention.

FIG. 1 is a block diagram showing a dedicated-short-range-communications system in accordance with embodiment 1 of the present invention. In the figure, when a base station apparatus 1 carries out dedicated short range communications with a mobile communication station 2 and receives type information indicating the type of data which an application installed in an external device can use, the base station apparatus 1 specifies data, which the application can use, with reference to the type information and transmits the specified data to the mobile communication station 2. The mobile communication station 2 can be a station such as an ETC device, a mobile phone, or a mobile PC, which is mounted to a moving object, such as a vehicle or a human being. When entering a dedicated-short-range-communications area of the base station apparatus 1, the mobile communication station 2 transmits type information, which it has pre-registered therein, to the base station apparatus 1, receives data from the base station apparatus 1, and transfers the data to external devices.

A multifunctional application unit 4 which is an external device is connected to the mobile communication station 2 via a network 3, and, when receiving data (e.g., image data and/or text data) transmitted thereto from the mobile communication station 2, carries out a display or the like of an image and/or a text according to the received data. A sound playing unit 5 which is an external device is connected to the mobile communication station 2 via the network 3, and, when receiving data (e.g., voice data) transmitted thereto from the mobile communication station 2, reproduces voice according to the received data.

A character-to-voice converter 6 which is an external device is connected to the mobile communication station 2 via the network 3, and, when receiving data (e.g., alphabetic data) transmitted thereto from the mobile communication station 2, performs a process of converting the data into voice data, or the like. A traffic data analyzing unit 7 which is an external device is connected to the mobile communication station 2 via the network 3, and, when receiving data (e.g., traffic data) transmitted thereto from the mobile communication station 2, performs a process of analyzing the data, or the like. A map guide unit 8 performs a process of displaying an analysis result of the traffic data analyzing unit 7, or the like.

As shown in FIG. 1, the mobile communication station 2 is mounted in a moving object, and the multifunctional application unit 4, the sound playing unit 5, the character-to-voice converter 6, the traffic data analyzing unit 7, and the map guide unit 8 are all mounted in the moving object, too. However, the mobile communication station 2 need not have all of the plurality of external devices 4 to 8, and may have one or more of the plurality of external devices 4 to 8.

Figure 2:
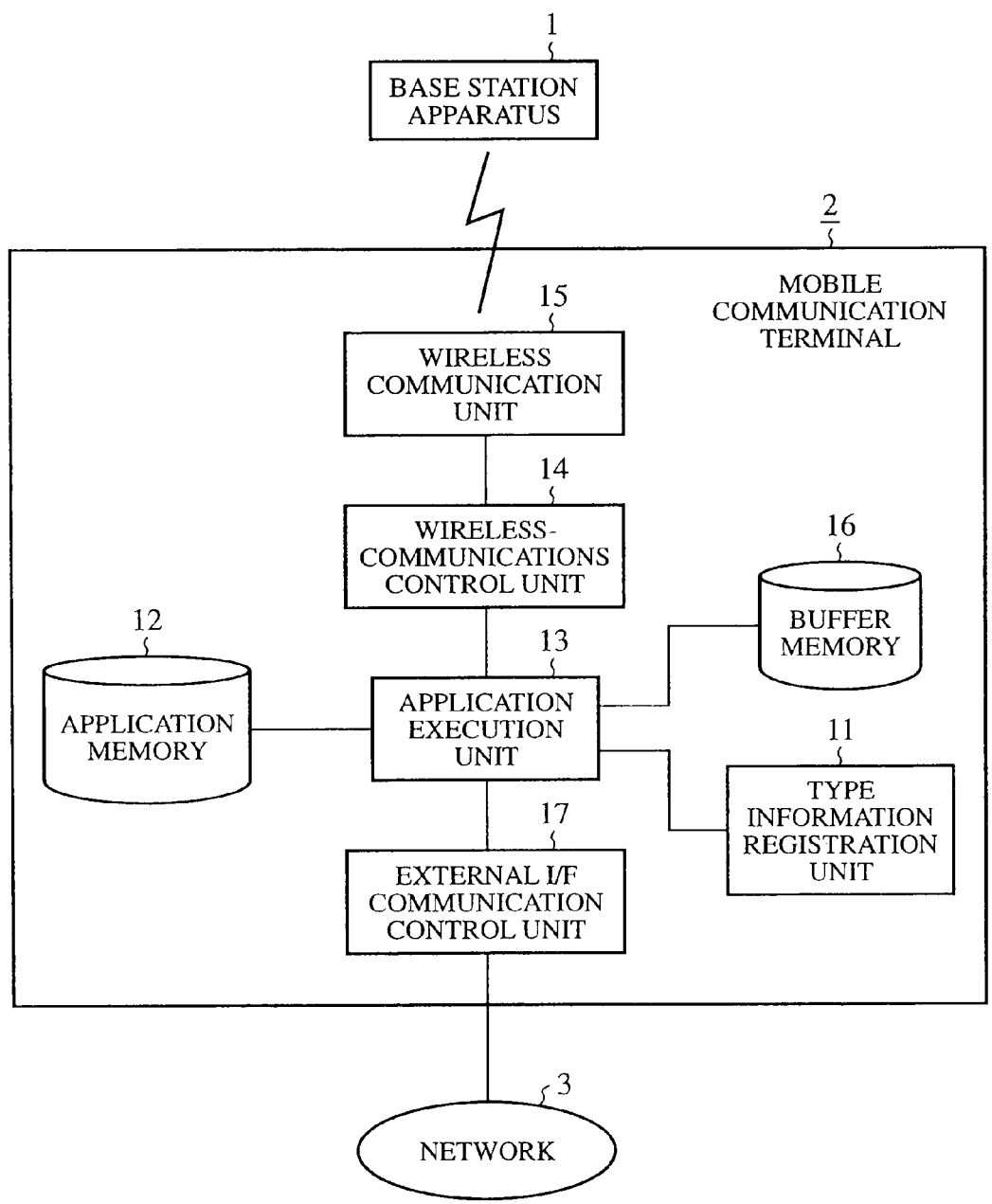
FIG. 2 is a block diagram showing a mobile communication station in accordance with embodiment 1 of the present invention.

FIG. 2 is a block diagram showing the mobile communication station in accordance with embodiment 1 of the present invention. A type information registration unit 11 of FIG. 2 has a function of receiving a request for registration of type information indicating the type of data which an application installed in an external devices, such as the multifunctional application unit 4 or the sound playing unit 5, can use. For example, when an external I/F communication control unit 17 receives type information transmitted from the multifunctional application unit 4, the type information registration unit 11 stores the type information therein. The type information registration unit 11 constitutes a registration means.

An application memory 12 stores applications (e.g., a memory read/write application, a notification application of ID, a payment application, and a PUSH receiving application) which an application execution unit 13 can execute. The application execution unit 13 is constructed of a CPU having an information processing function. For example, when executing the PUSH receiving application stored in the application memory 12, the application execution unit 13 transmits a request for transmission of the type information registered into the type information registration unit 11 to a wireless-communications control unit 14. When receiving data transmitted thereto from the base station apparatus 1, a wireless communication unit 15 performs a process of storing the received data in a buffer memory 16. The application execution unit 13 also carries out a process of transmitting a request for transfer of data stored in the buffer memory 16 to the external I/F communication control unit 17.

The wireless-communications control unit 14 controls the wireless communication unit 15 under the control of the application execution unit 13. The wireless communication unit 15 is constructed of wireless radio equipment that carries out dedicated short range communications with the base station apparatus 1, and an antenna. For example, the wireless communication unit 15 modulates a carrier signal with the type information read out of the type information registration unit into an electric wave which is a radio signal and transmits it to the base station apparatus 1. The wireless communication unit 15 also receives an electric wave transmitted thereto from the base station apparatus 1, and carries out a process of demodulating the electric wave to generate data, and so on. The application execution unit 13, the wireless-communications control unit 14, and the wireless communication unit 15 constitute a wireless communications means. The buffer memory 16 constitutes a data storage means for storing data received by the wireless communication unit 15.

The external I/F communication control unit 17 is connected to the network 3, and has an interface function of transmitting and receiving information to and from each external device, such as the multifunctional application unit 4. When receiving type information transmitted thereto from an external device, such as the multifunctional application unit 4, the external I/F communication control unit 17 stores the type information in the type information registration unit 11. When receiving a request for transfer of data from the application execution unit 13, the external I/F communication control unit 17 carries out a process of transferring the data stored in the buffer memory 16 to an external device, such as the multifunctional application unit 4. The application execution unit 13 and the external I/F communication control unit 17 constitute a data transfer means.

Figure 3:
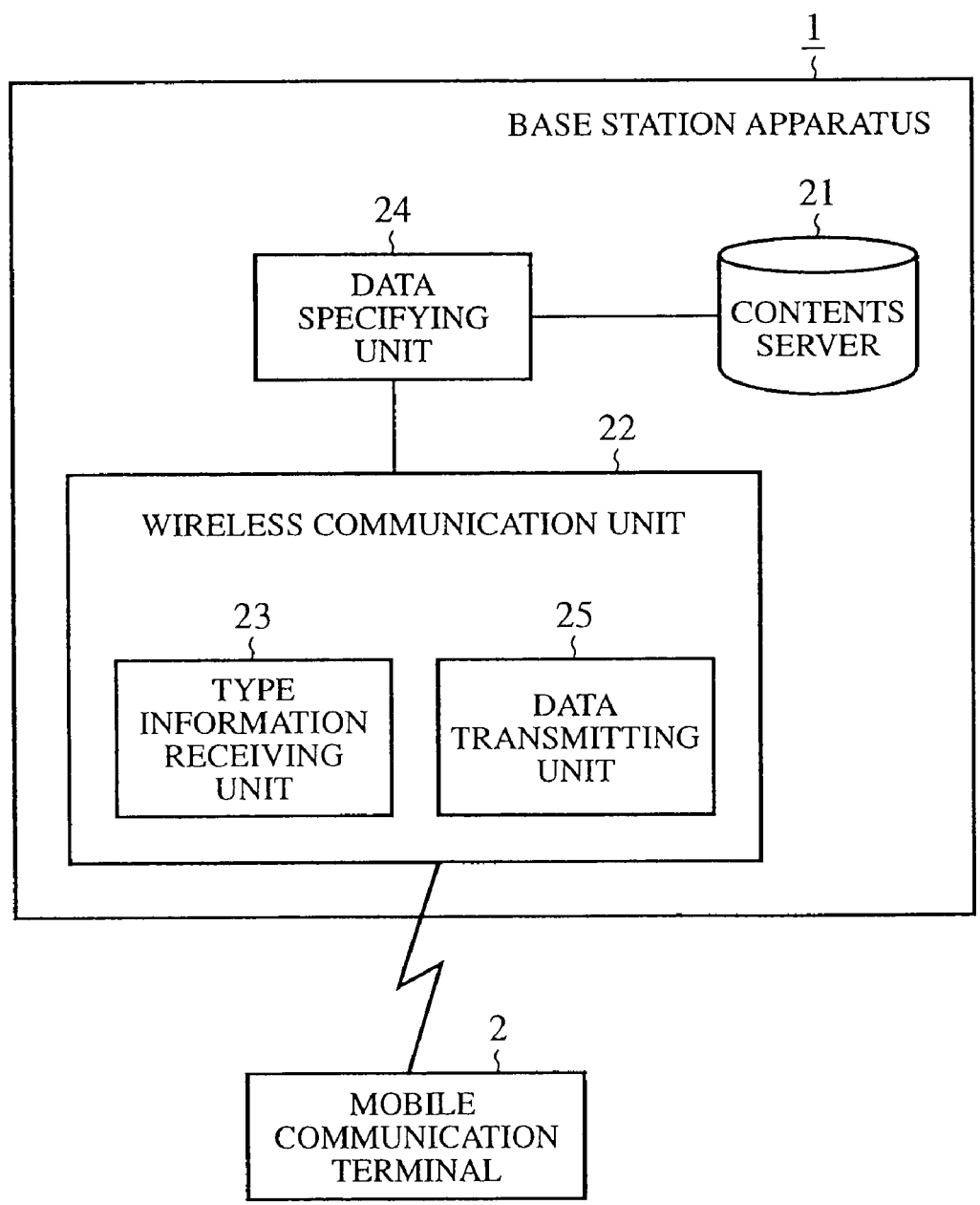
FIG. 3 is a block diagram showing a base station apparatus in accordance with embodiment 1 of the present invention.

FIG. 3 is a block diagram showing the base station apparatus in accordance with embodiment 1 of the present invention. A contents server 21 of FIG. 3 stores data about contents associated with various types of applications. A wireless communication unit 22 is provided with wireless radio equipment that carries out dedicated short range communications with the mobile communication station 2, an antenna, and so on. A type information receiving unit 23 of the wireless communication unit 22 carries out a process of receiving type information transmitted thereto from the mobile communication station 2. The type information receiving unit 23 constitutes a type information receiving means.

A data specifying unit 24 refers to the type information received by the type information receiving unit 23, searches through the contents data stored in the contents server 21 for data which applications can use, and outputs the data to a data transmitting unit 25. The data specifying unit 24 constitutes a data specifying means. The data transmitting unit 25 of the wireless communication unit 22 carries out a process of transmitting the data outputted thereto from the data specifying unit 24 to the mobile communication station 2. The data transmitting unit 25 constitutes a data transmitting means.

Figure 4:
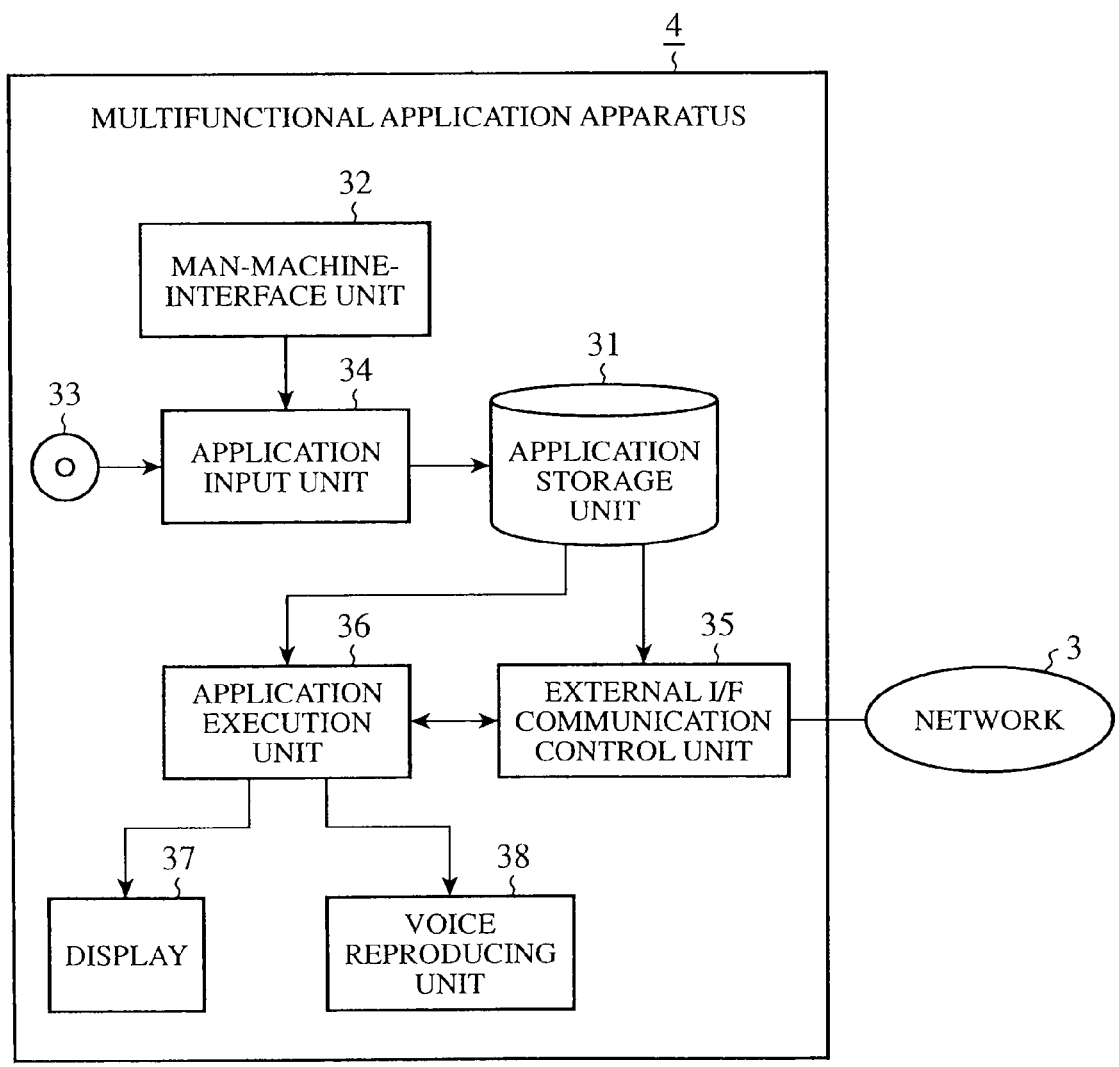
FIG. 4 is a block diagram showing an external device in accordance with embodiment 1 of the present invention.

FIG. 4 is a block diagram showing an external device in accordance with embodiment 1 of the present invention. Although FIG. 4 shows the internal structure of the multifunctional application unit 4, each of the other external devices (i.e., the sound playing unit 5, the character-to-voice converter 6, and the traffic data analyzing unit 7) has much the same structure as the multifunctional application unit 4 with the exception that it has its own applications installed therein. In each of the other external devices, some functions can be eliminated. In the figure, an application storage unit 31 is a memory for storing applications which an application execution unit 36 can execute. A man-machine-interface unit 32 is an interface, such as a mouse or a keyboard, for receiving operations performed by the user.

An application input unit 34 is constructed of a disk drive or the like. When the user needs a new service, he or she makes the multifunctional application unit 4 read a corresponding new application from a disk 33, such as a CD-ROM or DVD-ROM, and carry out a process of storing the application in the application storage unit 31. An external I/F communication control unit 35 is connected to the network 3, and transmits type information indicating the type of data, which an application stored in the application storage unit 31 can use, to the mobile communication station 2 and carries out a process of receiving data transmitted thereto from the mobile communication station 2.

The application execution unit 36 is constructed of a CPU having an information processing function. By executing an application stored in the application storage unit 31, the application execution unit 36 carries out a display or the like of an image and/or a text according to the data received by the external I/F communication control unit 35. A display 37 displays execution results obtained by the application execution unit 36. A voice reproducing unit 38 is constructed of a speaker etc., and reproduces voice etc.

Figure 8:
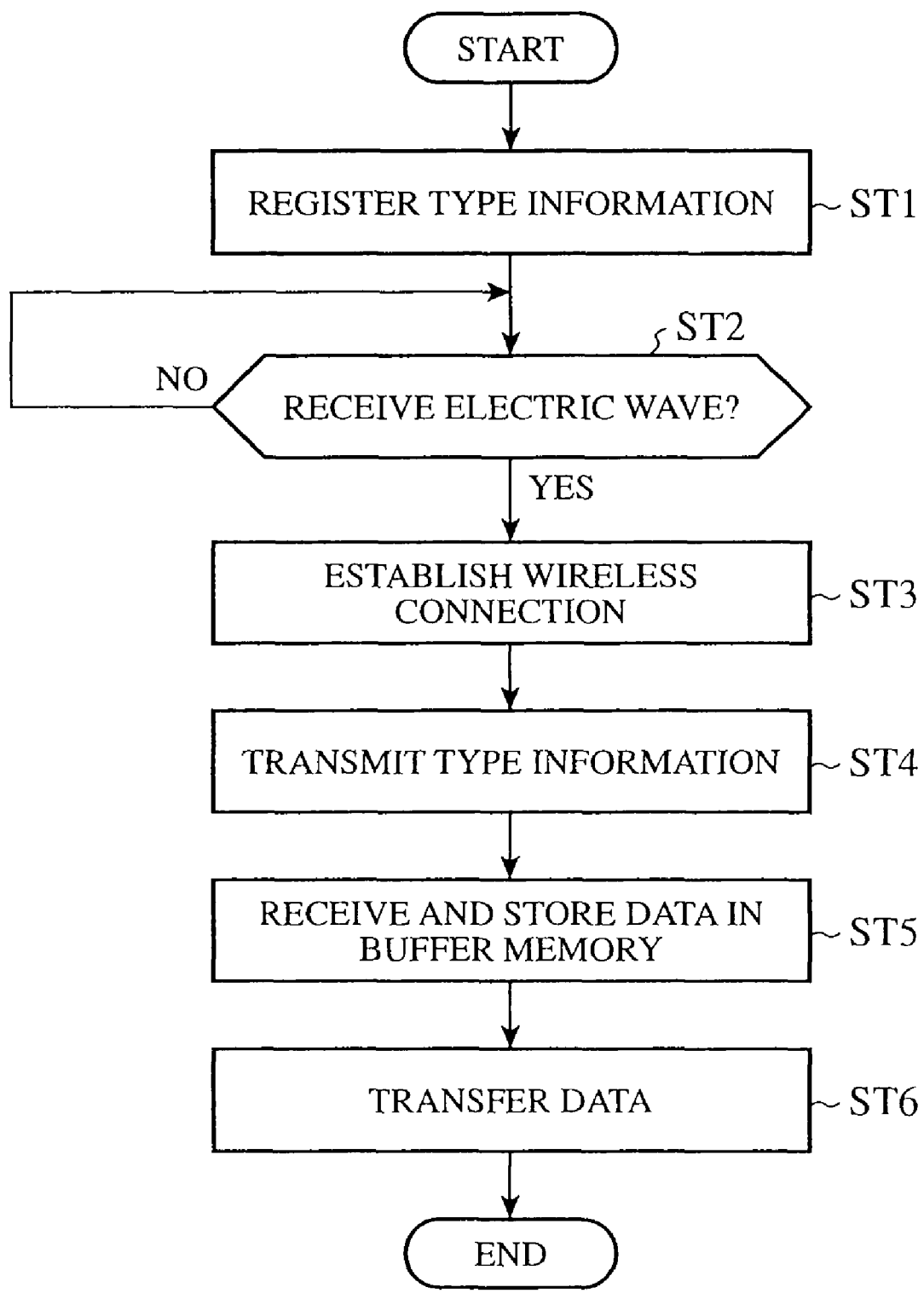
FIG. 8 is a flow chart showing processing performed by the mobile communication station in accordance with embodiment 1 of the present invention.
Figure 9:
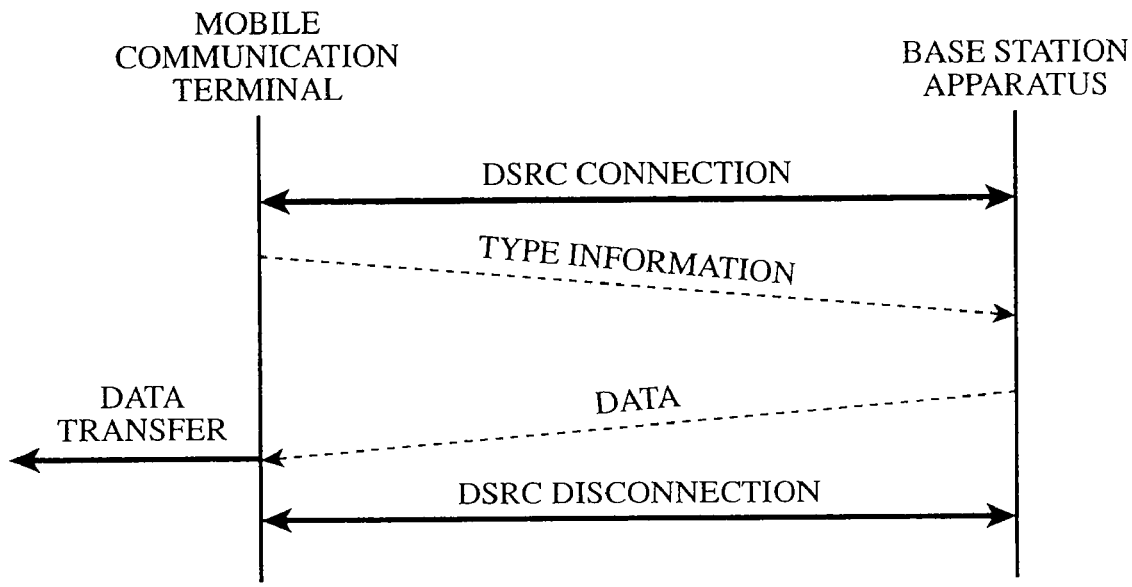
FIG. 9 is a sequence diagram showing a sequence of transmission of data between the mobile communication station and the base station apparatus.

FIG. 5 is a diagram showing identifiers that identify applications which can be installed in an external device (e.g., the application storage unit 31 of the multifunctional application unit 4), and FIGS. 6 and 7 are explanation diagrams showing identifiers that identify data types. Data types are classified according to compression methods, format types (e.g., jpeg, tiff, way, and mp3), etc. FIG. 8 is a flow chart showing processing carried out by the mobile communication station in accordance with embodiment 1 of the present invention, and FIG. 9 is a sequence diagram showing a sequence of data transmission between the mobile communication station and the base station apparatus.

Next, the operation of the dedicated-short-range-communications system in accordance with embodiment 1 of the present invention will be explained. One or more applications, such as a graphic display application, are pre-stored in the application storage unit 31 of the multifunctional application unit 4 which is an external device. Therefore, when the external I/F communication control unit 35 of the multifunctional application unit 4 receives image data from the mobile communication station 2, the application execution unit 36 can provide a service for displaying a corresponding image on the display 37 for the user by executing the graphic display application.

However, when the user desires an additional service for converting alphabetic data into voice data and reproducing voice, in addition to the service for displaying images, the user needs to add a character-to-voice converting application for providing the additional service for the user to the multifunctional application unit 4. Then, the user operates the man-machine-interface unit 32 of the multifunctional application unit 4 so as to input a request for addition of the character-to-voice converting application, and inserts a disk 33 that stores the character-to-voice converting application therein into the application input unit 34.

When the request for addition of the character-to-voice converting application is inputted from the man-machine-interface unit 32 and the disk 33 is inserted thereinto, the application input unit 34 of the multifunctional application unit 4 reads the character-to-voice converting application stored in the disk 33 and stores the character-to-voice converting application in the application storage unit 31. Instead of reading the character-to-voice converting application stored in the disk 33 and storing the character-to-voice converting application in the application storage unit 31, the application input unit 34 of the multifunctional application unit 4 can download the character-to-voice converting application from a site connected to the Internet, and then store it in the application storage unit 31, for example.

When the new application is stored in the application storage unit 31, the application execution unit 36 of the multifunctional application unit 4 specifies what type of application the new application is with reference to the identifier added to the new application. In the example of FIG. 5, the identifier of the character-to-voice converting application is "tts" and has a value of "0x05."

When determining that the new application is the character-to-voice converting application, the application execution unit 36 of the multifunctional application unit 4 specifies the type of data, which the character-to-voice converting application can use, with reference to, for example, a table showing a one-to-one correspondence between applications and data. As an alternative, the application execution unit 36 of the multifunctional application unit 4 can specify the type of data, which the character-to-voice converting application can use, with reference to the identifier added to the character-to-voice converting application which is the new application. The method for specifying the type of data which the character-to-voice converting application can use is not limited to the above-mentioned one. For example, the application execution unit 36 of the multifunctional application unit 4 can transmit the identifier of the character-to-voice converting application to another search device, and can make the other search device notify the type of data, which the character-to-voice converting application can use, thereto. For convenience in description, it is assumed that the type of data which the character-to-voice converting application can use is "text/*" contents type (refer to FIG. 6).

When the application execution unit 36 determines that the type of data which the character-to-voice converting application can use is "text/*" contents type, the external I/F communication control unit 35 of the multifunctional application unit 4 connects with the network 3 and transmits type information indicating the type of data, which the character-to-voice converting application can use, to the mobile communication station 2. When the external I/F communication control unit 17 of the mobile communication station 2 receives the type information transmitted thereto from the multifunctional application unit 4, the type information registration unit 11 of the mobile communication station 2 receives and stores a registration of the type information therein (in step ST1). When registering the type information therein, the type information registration unit 11 adds the ID of the external device which is the source of the type information to the type information, for example, in order to identify the external device which is the source of the type information.

The wireless communication unit 15 of the mobile communication station 2 continuously monitors electric waves, such as pilot signals, transmitted thereto from the base station apparatus 1 under the control of the wireless-communications control unit 14, and, when the mobile communication station 2 enters the dedicated-short-range-communications area of the base station apparatus 1 and the wireless communication unit 15 receives an electric wave transmitted from the base station apparatus 1 (in step ST2), notifies the reception of the electric wave to the wireless-communications control unit 14. When receiving a notification of receipt of an electric wave from the wireless communication unit 15, the wireless-communications control unit 14 of the mobile communication station 2 makes the wireless communication unit 15 transmit information for wireless connection to the base station apparatus 1 so as to establish a wireless connection (i.e., a DSRC connection) with the base station apparatus 1 (in step ST3).

When a wireless connection with the base station apparatus 1 is established, the application execution unit 13 of the mobile communication station 2 issues a request for transmission of the type information registered in the type information registration unit 11 to the wireless-communications control unit 14 by performing the PUSH receiving application stored in the application memory 12. When receiving the request for transmission of the type information from the application execution unit 13, the wireless-communications control unit 14 of the mobile communication station 2 makes the wireless communication unit 15 transmit the type information registered in the type information registration unit 11 to the base station apparatus 1, as shown in FIG. 9 (in step ST4). For example, when a graphic display application and a character-to-voice converting application are stored in the application storage unit 31 of the multifunctional application unit 4, the wireless-communications control unit 14 makes the wireless communication unit 15 transmit the type information indicating the types of data, which the graphic display application and the character-to-voice converting application can use, to the base station apparatus 1.

The type information receiving unit 23 of the base station apparatus 1 carries out a process of receiving the type information transmitted thereto from the mobile communication station 2. When the type information receiving unit 23 receives the type information, the data specifying unit 24 of the base station apparatus 1 searches through data stored in the contents server 21 for data, which one or more certain applications can use, with reference to the type information, and then outputs the searched-for data to the data transmitting unit 25. For example, the data specifying unit 24 of the base station apparatus 1 searches for data which the graphic display application and the character-to-voice converting application of the multifunctional application unit 4 can use, and then outputs the searched-for data to the data transmitting unit 25. When receiving the searched-for data from the data specifying unit 24, the data transmitting unit 25 of the base station apparatus 1 carries out a process of transmitting the data to the mobile communication station 2, as shown in FIG. 9.

When the wireless communication unit 15 of the mobile communication station 2 receives the data transmitted thereto from the base station apparatus 1, the application execution unit 13 of the mobile communication station 2 temporarily stores the data in the buffer memory 16 (in step ST5). When finishing storing the data into the buffer memory 16, the application execution unit 13 of the mobile communication station 2 issues a request for transfer of the data temporarily stored in the buffer memory 16 to the external I/F communication control unit 17.

When receiving the request for transfer of the data from the application execution unit 13, the external I/F communication control unit 17 of the mobile communication station 2 specifies the destination of the transfer of the data with reference to the type information registered in the type information registration unit 11. When then determining that the destination of the transfer of the data is the multifunctional application unit 4, the external I/F communication control unit 17 connects with the network 3 and then transfers the data stored in the buffer memory 16 to the multifunctional application unit 4 (in step ST6).

The external I/F communication control unit 35 of the multifunctional application unit 4 carries out a process of receiving the data transmitted thereto from the mobile communication station 2. When the external I/F communication control unit 35 receives the data transferred thereto from the mobile communication station 2, the application execution unit 36 of the multifunctional application unit 4 executes one or more certain application which can use the data (e.g., the graphic display application and the character-to-voice converting application).

As can be seen from the above description, in accordance with this embodiment 1, the mobile communication station 2 is provided with the type information registration unit 11 for registering type information indicating the type of data, which an application installed in an external device can use, therein, and transmits the type information registered in the type information registration unit 11 to the base station apparatus 1, receives data, which the application installed in the external device can use, from the base station apparatus 1, and transfers the data to the external device. Therefore, the present embodiment offers an advantage of being able to provide a new service by simply making a registration of type information into the type information registration unit 11 without adding any application to the mobile communication station 2.

In addition, in accordance with this embodiment 1, the base station apparatus 1 is so constructed as to, when receiving type information indicating the type of data, which one or more certain applications can use, from the mobile communication station 2, specify corresponding data, which the one or more certain applications can use, with reference to the type information and then transmit the data to the mobile communication station 2. Therefore, the present embodiment offers another advantage of being able to transmit data associated with an application installed in an external device to the mobile communication station 2.

Figure 10:
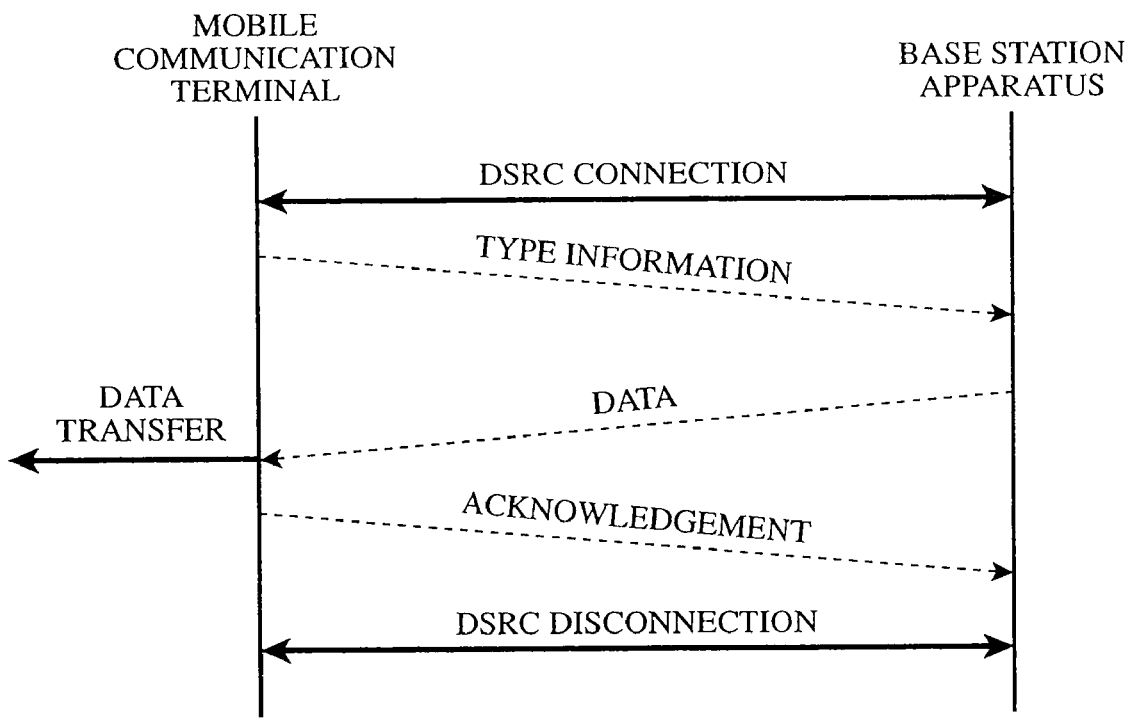
FIG. 10 is a sequence diagram showing a sequence of transmission of data between the mobile communication station and the base station apparatus.

As previously mentioned, in accordance with this embodiment 1, the mobile communication station 2 transmits type information to the base station apparatus 1 and the mobile communication station 2 then receives corresponding data from the base station apparatus 1. When the mobile communication station 2 receives the corresponding data from the base station apparatus 1, the mobile communication station 2 can return an acknowledgment signal indicating that it has normally received the data to the base station apparatus 1, as shown in FIG. 10. In this embodiment 1, the addition of an application to the multifunctional application unit 4 which is an external device is explained as an example. This embodiment is not limited to this case. This embodiment 1 can be also applied to a case where an application is added to the sound playing unit 5, the character-to-voice converter 6, or the traffic data analyzing unit 7 which is another external device, and a case where a new external device in which an application is installed is additionally connected to the network 3.

Embodiment 2

In the dedicated-short-range-communications system in accordance with above-mentioned embodiment 1, when the external I/F communication control unit 17 receives type information transmitted thereto from the multifunctional application unit 4, the type information registration unit 11 receives a registration of the type information and stores it therein, as previously mentioned. In contrast, a dedicated-short-range-communications system in accordance with this embodiment 2 is provided with a mobile communication station 2 including a type information registration unit 11 having a man-machine-interface function of receiving an input of type information (e.g., a mouse, a keyboard, or a touch panel), for, when the user operates the man-machine-interface function so as to input type information therein, registering the type information therein. This embodiment thus offers an advantage of being able to register any type information without the mobile communication station 2 carrying out a process of receiving type information from an external device.

Embodiment 3

In accordance with above-mentioned embodiments 1 and 2, the mobile communication station 2 registers type information indicating the type of data, which an application can use, into the type information registration unit 11, as previously mentioned. In contrast, a mobile communication station 2 in accordance with this embodiment 3 can register type information including information indicating a data size which it can receive, in addition to information indicating the type of data which an application can use, into a type information registration unit 11, and can transmit the type information registered in the type information registration unit 11 to a base station apparatus 1.

To be more specific, as shown in FIG. 11, the type information registration unit 11 of the mobile communication station 2 registers type information (ClientInformation) including the types of applications which the mobile communication station 2 can receive, the type of contents (data) which the mobile communication station 2 can receive, the buffer size of a buffer memory 16, and a maximum size of contents (i.e., data) which the mobile communication station 2 can receive, additional information, etc. therein.

When a type information receiving unit 23 receives type information from the mobile communication station 2, a data specifying unit 24 of the base station apparatus 1 searches through data stored in a contents server 21 for data, which one or more applications can use, according to the type information, like that of above-mentioned embodiment 1. In this case, the data specifying unit 24 of the base station apparatus 1 carries out the searching on condition that all data to be searched for have a size that does not exceed the maximum size of contents (i.e., data) contained in the type information. When data to be searched for has a size larger than the buffer size of the buffer memory 16 even if the data has a size that does not exceed the maximum size of contents (i.e., data), an overflow error occurs when the mobile communication station 2 receives the data.

To solve this problem, when receiving data which has been searched for by the data specifying unit 24, a data transmitting unit 25 of the base station apparatus 1 compares the data size of the data with the buffer size of the buffer memory 16 specified by the type information. When determining that the data has a data size larger than the buffer size of the buffer memory 16, the data transmitting unit 25 of the base station apparatus 1 divides the data into several pieces each having a size equal to or smaller than the buffer size of the buffer memory 16, and then transmits them to the mobile communication station 2.

FIGS. 12 to 14 are diagrams showing the data structure of data which the base station apparatus transmits to the mobile communication station 2. As can be seen from the figures, data transmitted from the base station apparatus 1 to the mobile communication station 2 includes information indicating whether the base station apparatus 1 has divided the data into several pieces when transmitting the data to the mobile communication station 2. FIG. 12 shows the data structure (corresponding to FIG. 9) in a case where the mobile communication station 2 sends no acknowledgement signal back to the base station apparatus 1, FIG. 13 shows the data structure (corresponding to FIG. 10) in a case where the mobile communication station 2 sends an acknowledgement signal back to the base station apparatus 1, and FIG. 14 shows the data structure in a case where the base station apparatus 1 divides the data into several pieces.

Figure 15:
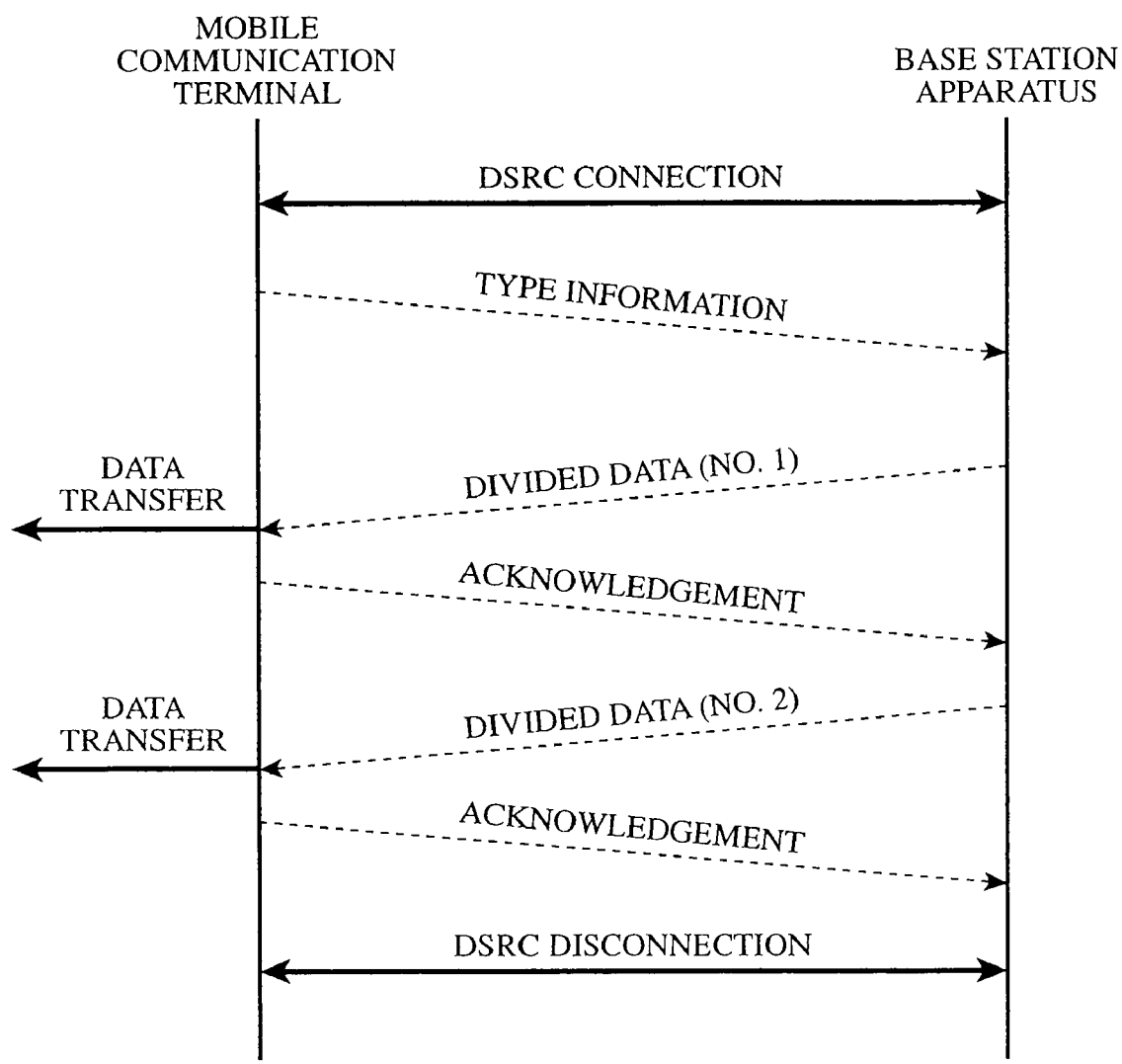
FIG. 15 is a sequence diagram showing a sequence of transmission of data between the mobile communication station and the base station apparatus.

When a wireless communication unit 15 of the mobile communication station 2 receives data transmitted thereto from the base station apparatus 1, the application execution unit 13 of the mobile communication station 2 temporarily stores the data in the buffer memory 16, like that of above-mentioned embodiment 1. When the base station apparatus 1 has divided the original data into several pieces when transmitting the data to the mobile communication station 2, an application execution unit 13 determines if an external I/F communication control unit 17 has transferred the data stored in the buffer memory 16 to a multifunctional application unit 4. After that, as shown in FIG. 15, when determining that the external I/F communication control unit 17 has transferred the data stored in the buffer memory 16 to the multifunctional application unit 4, the application execution unit 13 sends an acknowledgement signal back to the base station apparatus 1 by issuing a request for transmission of acknowledgement indicating that the mobile communication station 2 has normally received the data to a wireless-communications control unit 14.

When receiving the acknowledgement signal from the mobile communication station 2, if one or more of the several pieces into which the original data has been divided remain to be transmitted to the mobile communication station 2, the data transmitting unit 25 of the base station apparatus 1 transmits those remaining pieces of data to the mobile communication station 2. The data transmission between the base station apparatus 1 and the mobile communication station 2 is repeatedly carried out until the transmission of all the pieces of data into which the original data has been divided is completed.

As can be seen from the above description, in accordance with this embodiment 3, the mobile communication station 2 in accordance with this embodiment 3 is so constructed as to register type information including information indicating a data size which it can receive, in addition to information indicating the type of data which an application can use, in the type information registration unit 11, and can transmit the type information registered in the type information registration unit 11 to the base station apparatus 1. Therefore, the present embodiment offers an advantage of being able to prevent occurrence of an overflow at a time of reception of data from the base station apparatus 1 by the buffer memory 16 even when original data to be transmitted has a size larger than the buffer size of the buffer memory 16.

Embodiment 4

Figure 16:
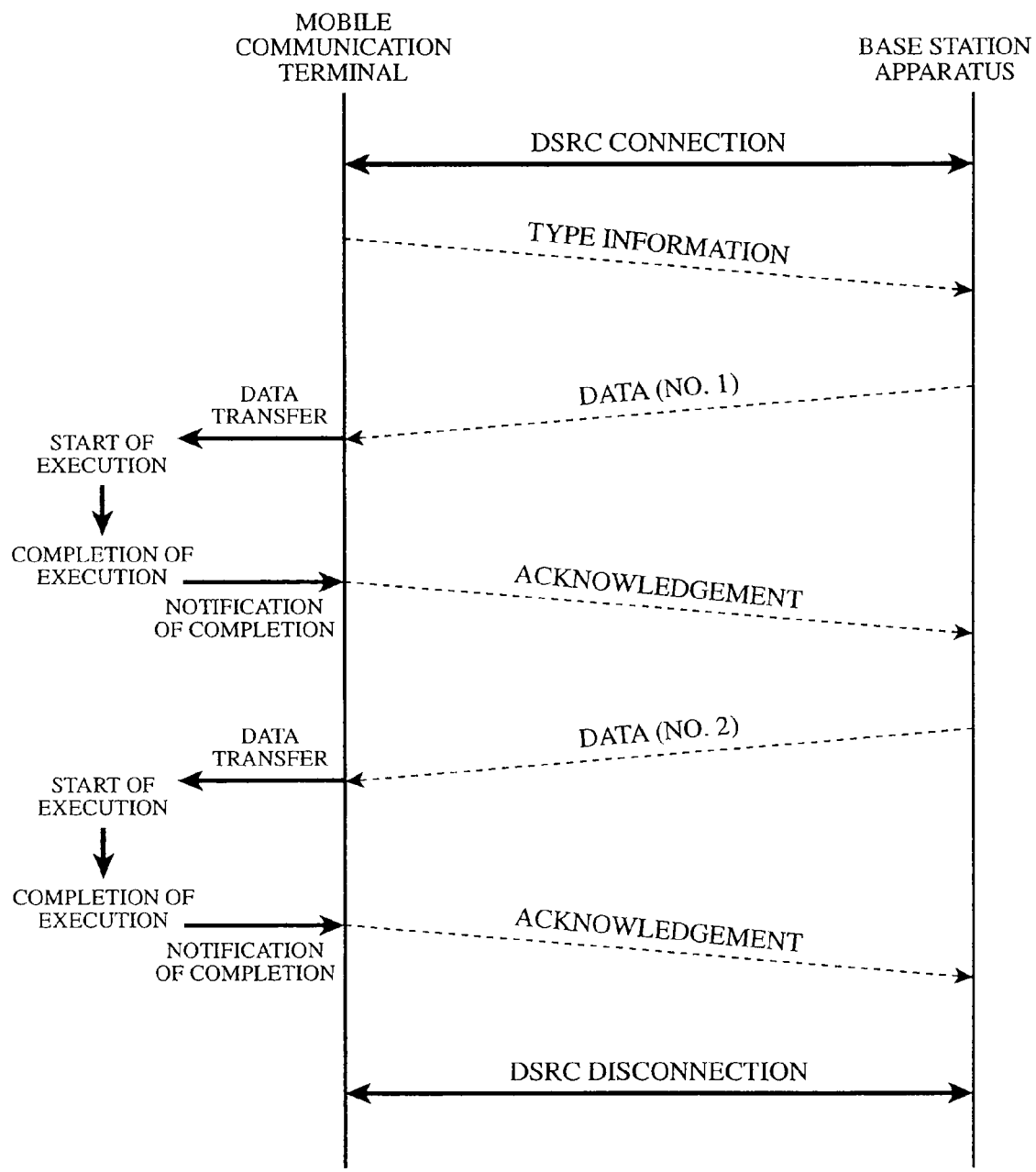
FIG. 16 is a sequence diagram showing a sequence of transmission of data between a mobile communication station and a base station apparatus in a dedicated-short-range-communications system in accordance with embodiment 4 of the present invention.

In accordance with above-mentioned embodiment 1, when receiving data from the base station apparatus 1, the mobile communication station 2 sends an acknowledgement signal indicating that it has normally received the data back to the base station apparatus 1, as previously mentioned. The timing at which the mobile communication station 2 sends an acknowledgement signal to the base station apparatus 1 is not limited to the time of reception of the data transmitted from the base station apparatus 1. In accordance with embodiment 4, when a mobile communication station 2 transfers data received from a base station apparatus 1 to a corresponding external device or when the external device completes the execution of an application according to the data transferred thereto, the mobile communication station 2 sends an acknowledgement signal back to the base station apparatus 1 (refer to FIG. 16).

When a data specifying unit 24 of the base station apparatus 1 has searched for two or more data which an application can use, a data transmitting unit 25 of the base station apparatus 1 needs to transmit the two or more data to the mobile communication station 2 As mentioned above, every time when the base station apparatus 1 receives acknowledgement of receipt of data from the mobile communication station 2 after the mobile communication station 2 has received the data transmitted from the base station apparatus 1, the mobile communication station 2 has transferred the data to a corresponding external device, or the external device has completed the use of the data, the base station apparatus 1 can transmit necessary data one by one to the mobile communication station 2. Therefore, the present embodiment offers an advantage of being able to carry out reception, transfer, and reproduction of two or more data in order of transmission of the two or more data even when the base station apparatus 1 transmits the two or more data to the mobile communication station 2.

Embodiment 5

Figures 17, 18:
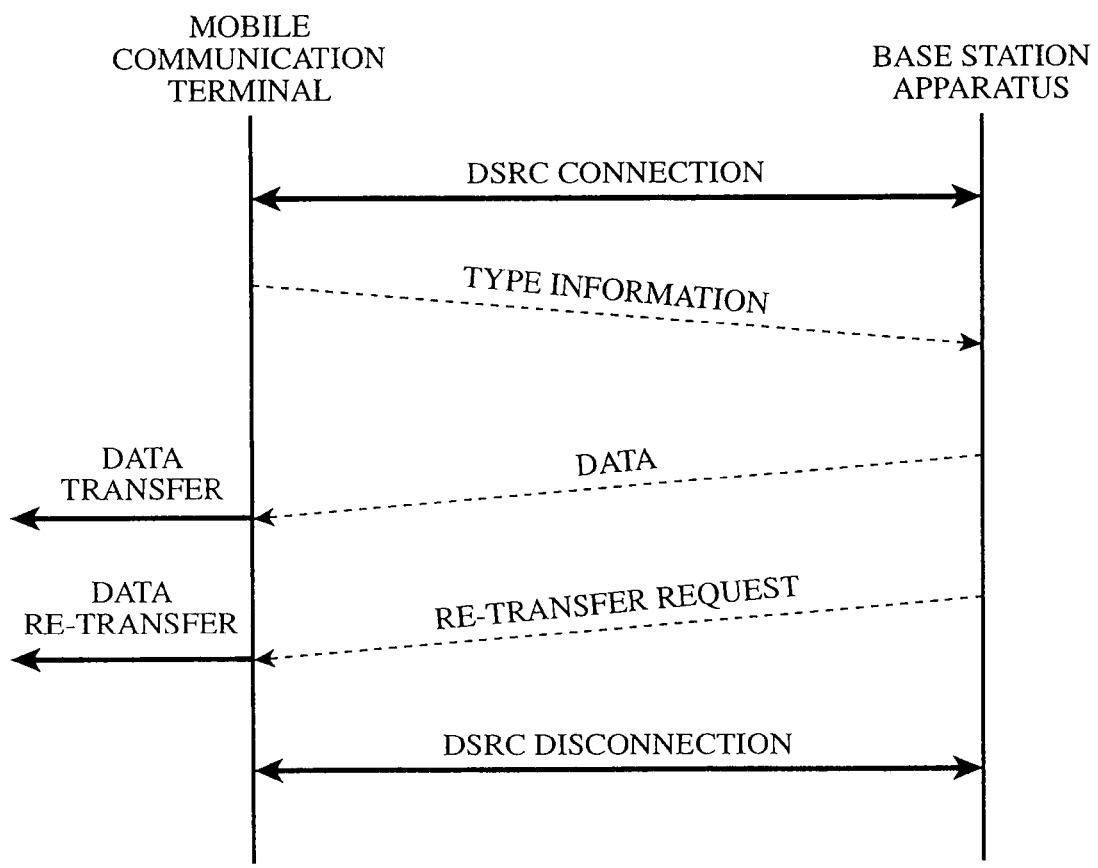
FIG. 17 is a sequence diagram showing a sequence of transmission of data between the mobile communication station and the base station apparatus in the dedicated-short-range-communications system in accordance with any one of embodiments 1 to 4 of the present invention.
FIG. 18 is a diagram showing the data structure of a request for re-execution of data.

Although no mention is made in particular, when the base station apparatus 1 in accordance with any one of above-mentioned embodiments 1 to 4 needs to provide the same data as data transmitted in the past to an application, the base station apparatus 1 transmits a request for re-execution of the data to the mobile communication station 2, as shown in FIG. 17. However, the request for re-execution of the data does not include a main part of the data. FIG. 18 is a diagram showing the data structure of a request for re-execution of data.

When a wireless communication unit 15 of a mobile communication station 2 receives a request for re-execution of data transmitted thereto from a base station apparatus 1, an application execution unit 13 of the mobile communication station 2 issues a request for re-transfer of the data already stored in a buffer memory 16 to an external I/F communication control unit 17. When receiving the request for re-transfer of the data from the application execution unit 13, the external I/F communication control unit 17 of the mobile communication station 2 specifies a destination of transmission of the data with reference to type information registered in a type information registration unit 11. When then determining that the destination of transmission of the data is a multifunctional application unit 4, the external I/F communication control unit 17 connects with a network 3 and then transfers the data stored in the buffer memory 16 to the multifunctional application unit 4, like that of above-mentioned embodiment 1.

As can be seen from the above description, in accordance with this embodiment 5, the mobile communication station 2 is provided with the buffer memory 16 for storing data received by the wireless communication unit 15, and, when the wireless communication unit 15 receives a request for re-execution of the data from the base station apparatus 1, re-transfers the data stored in the buffer memory 16 to the external device. The external device can perform an application multiple times according to the same data without the base station apparatus 1 repeatedly transmitting the same data to the mobile communication station 2 and the mobile communication station 2 repeatedly receiving the same data.

Embodiment 6

In accordance with any one of above-mentioned embodiments 1 to 5, when the mobile communication station 2 enters a dedicated-short-range-communications area of the base station apparatus 1 and then receives an electric wave transmitted thereto from the base station apparatus 1, the mobile communication station 2 establishes a wireless connection (i.e., a DSRC connection) with the base station apparatus 1 so as to carry out transmission of type information and data to the base station apparatus 1, as previously mentioned. In contrast, in accordance with this embodiment 6, a base station apparatus 1 can broadcast data periodically to a mobile communication station 2 that exists in the dedicated-short-range-communications area thereof.

Figure 19:
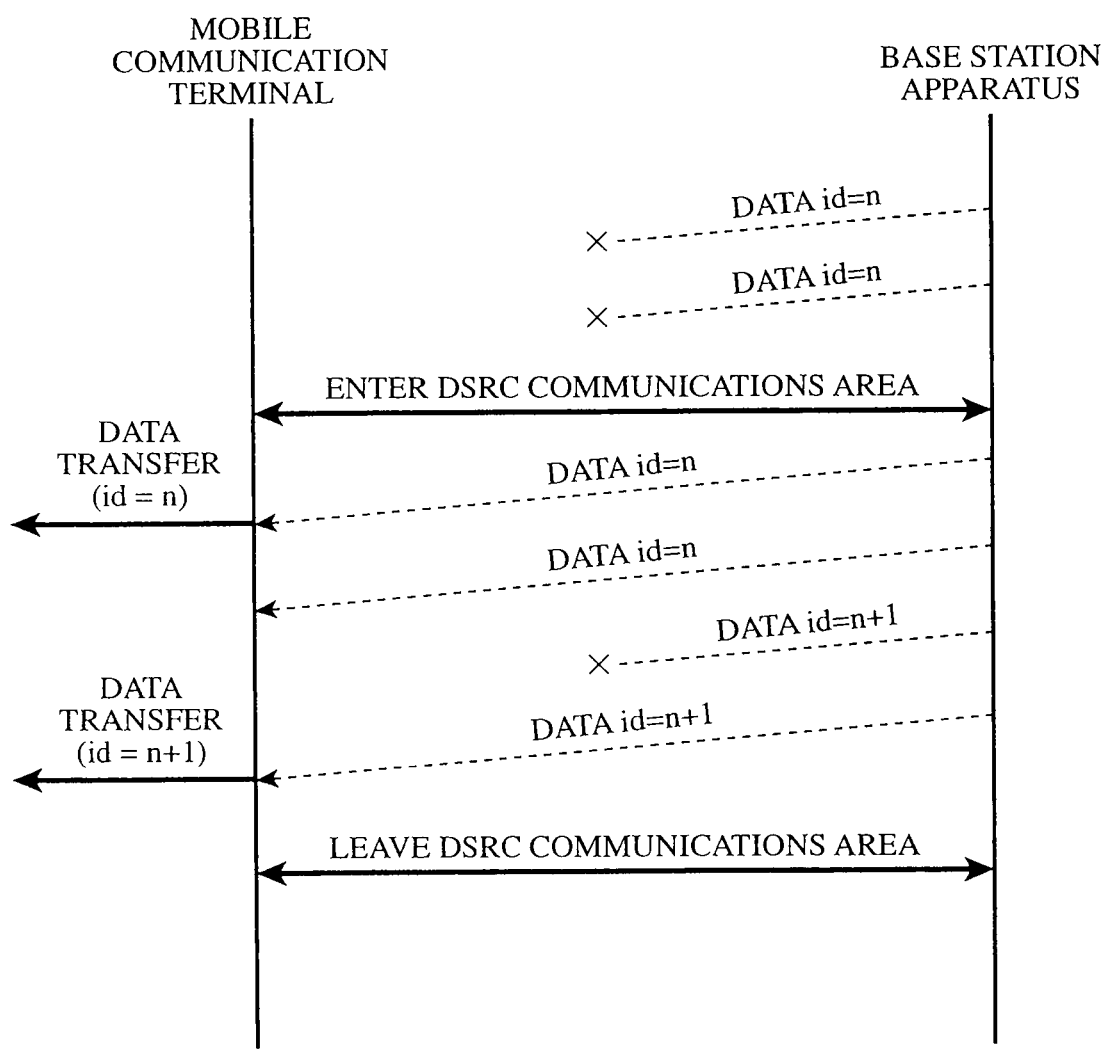
FIG. 19 is a sequence diagram showing transmission of data between a mobile communication station and a base station apparatus in a dedicated-short-range-communications system in accordance with embodiment 6 of the present invention.

Thus, when the base station apparatus 1 broadcasts data periodically to the mobile communication station 2 that exists in the dedicated-short-range-communications area thereof, since the base station apparatus 1 transmits the same data (including ID which identifies the data) multiple times without the mobile communication station 2 and the base station apparatus 1 establishing a DSRC connection between them (without the base station apparatus 1 being conscious of existence of the mobile communication station 2), the mobile communication station 2 may carry out reception of the same data from the base station apparatus 1 multiple times when the mobile communication station 2 stays for a long time in the dedicated-short-range-communications area of the base station apparatus 1, as shown in FIG. 19.

When a wireless communication unit 15 of the mobile communication station 2 receives data transmitted thereto from the base station apparatus 1, an application execution unit 13 of the mobile communication station 2 temporarily stores the data in a buffer memory 16 and then issues a request for transfer of the data to an external I/F communication control unit 17. However, when checking an ID contained in the data transmitted thereto from the base station apparatus 1 and then determining that the ID is the same as the ID of the data already stored in the buffer memory 16, the wireless communication unit 15 discards the data and issues no request for transfer of the data to the external I/F communication control unit 17.

Therefore, even if the wireless communication unit 15 receives the same data from the base station apparatus 1 multiple times, the application execution unit 13 of the mobile communication station 2 does not issue any request for transfer of the data multiple times. That is, the application execution unit 13 issues a request for transfer of the data only once. The transfer of the same data to a corresponding external device is not carried out multiple times, but is carried out only once.

As can be seen from the above description, in accordance with this embodiment 6, the mobile communication station 2 transfers received data to the external device only once even if the mobile communication station 2 receives the same data repeatedly transmitted thereto from the base station apparatus 1 multiple times. Therefore, the present embodiment offers an advantage of being able to transfer the same data to the external device only once without transferring the same data to the external device multiple times even when the base station apparatus 1 broadcasts the data periodically to the mobile communication station 2 that exists in the dedicated-short-range-communications area thereof.

Many widely different embodiments of the present invention may be constructed without departing from the spirit and scope of the present invention. It should be understood that the present invention is not limited to the specific embodiments described in the specification, except as defined in the appended claims.

What is claimed is:

1. A dedicated-short-range-communications system comprising:
a base station apparatus configured to in response to type information indicating a type of data available to each of a plurality of applications installed on an external device, said type information including a contents type identifier indicating a type of data available to the application, specify and send out data, which the application can use, based on the type information; and
a mobile communication station configured to pre-register type information indicating a type of data, a type of application, and a buffer size of a buffer memory of the mobile communication station to be used for data divisions by a base station apparatus, and a maximum size of contents, configured to transmit the type information to said base station apparatus when entering a communication area of said base station apparatus, configured to receive data, which said application installed in said external device can use, from said base station apparatus, and configured to transfer the received data, divided into several pieces at the base station apparatus, each having a size equal to or smaller than the buffer memory size of the buffer memory of the mobile communication station to said external device, in accordance with types of applications and a type of data to be reproduced, during the connection in dedicated-short-range-communications with the base station apparatus, and configured to specify the external device that is the destination of the transfer of the data based on the type information, wherein
the mobile communication station includes a data storage unit configured to store the data received from said base station apparatus, and the mobile communication station is configured to re-transfer the data stored in said data storage unit to said external device when said mobile communication station receives a request for re-execution of the data from said base station apparatus, said request for re-execution including a type of application.

2. A base station apparatus comprising:
a type information receiver configured to receive, from a mobile communication station, type information indicating a type of data available to each of a plurality of applications installed on an external device, said type information including a contents type identifier, a type of application, and a buffer size of a buffer memory of the mobile communication station to be used for data divisions by a base station apparatus, and a maximum size of contents;
a data specifying unit configured to specify data that the application is configured to use, based on the type information received by said type information receiver; and
a data transmitter configured to transmit the data specified by said data specifying unit to said mobile communication station, and, when the type information received by said type information receiver includes information about a received buffer size of the buffer memory of the mobile communication station, said data transmitter is configured to compare the received buffer size with a specified data size of the data specified by said data specifying unit, and, if the specified data size is larger than the received buffer size, said data transmitter divides the specified data specified by said data specifying unit into a number of pieces each having a size equal to or smaller than the data size of the received buffer size of the buffer memory of the mobile communication station, and then transmits the pieces to said mobile communication station, wherein
said data transmitter is further configured to transmit, to the mobile communication station, a request for re-execution of the specified data, the request for re-execution including a type of application and causing the mobile communication station to re-transfer the specified data previously transmitted from the base station to the external device.

* * * * *